United States Patent
Arai et al.

(10) Patent No.: US 7,369,099 B2
(45) Date of Patent: May 6, 2008

(54) MULTI-DISPLAY CONTROL SYSTEM AND IMAGE DISPLAY APPARATUS

(75) Inventors: Yutaka Arai, Atsugi (JP); Takashi Shimizu, Ashigarakami-gun (JP); Masatoshi Abe, Odawara (JP)

(73) Assignee: NEC-Mitsubishi Electric Visual Systems Corporation, Tokyo (JP)

( * ) Notice: Subject to any disclaimer, the term of this patent is extended or adjusted under 35 U.S.C. 154(b) by 340 days.

(21) Appl. No.: 10/453,308

(22) Filed: Jun. 3, 2003

(65) Prior Publication Data
US 2003/0227423 A1 Dec. 11, 2003

(30) Foreign Application Priority Data
Jun. 7, 2002 (JP) ............... 2002-167127
Jun. 26, 2002 (JP) ............... 2002-186339

(51) Int. Cl.
G09G 5/00 (2006.01)
(52) U.S. Cl. ............ 345/1.1; 345/2.1; 345/2.2; 345/2.3; 345/3.1
(58) Field of Classification Search .......... 345/1.1, 345/2.1–2.2, 2.3, 3.1
See application file for complete search history.

(56) References Cited

U.S. PATENT DOCUMENTS

| | | | | |
|---|---|---|---|---|
| 5,414,471 A | * | 5/1995 | Saitoh et al. | 725/56 |
| 6,448,956 B1 | * | 9/2002 | Berman et al. | 345/156 |
| 6,509,911 B1 | * | 1/2003 | Shimotono | 715/761 |
| 2003/0189529 A1 | * | 10/2003 | Martinez et al. | 345/1.3 |
| 2004/0239890 A1 | * | 12/2004 | Starkweather | 353/69 |

FOREIGN PATENT DOCUMENTS

| | | | |
|---|---|---|---|
| JP | 3-095593 | | 4/1991 |
| JP | 05-100644 | | 4/1993 |
| JP | 05-127856 | * | 5/1993 |
| JP | 5127856 A | | 5/1993 |
| JP | 5249932 A | | 9/1993 |
| JP | 5-323932 | | 12/1993 |
| JP | 8-263174 | | 10/1996 |

(Continued)

Primary Examiner—Richard Hjerpe
Assistant Examiner—Leonid Shapiro
(74) Attorney, Agent, or Firm—Scully, Scott, Murphy & Presser, P.C.

(57) ABSTRACT

A multi-display control system enables an operation screen to come up on an operator's front screen when an application performing a display operation changes, without the need for the operator to move the display image.

When the conditions for image detection have been met, it is detected where the position of a mouse is on a hypothetical single-sheet page 5 (process 1). Next, from the position detection result it is assessed if the mouse is on a second sub display apparatus 8 (process 2). Then in the case where the assessed operating screen is not the main display apparatus 6, the screen contents of the second sub display apparatus 8 and the screen contents of the main display apparatus 6 are exchanged and displayed on the respective image display apparatuses. That is, the screen contents of the second sub display apparatus 8 are transformed to the main display apparatus 6, and the screen contents of the main display apparatus 6 are transformed to the second sub display apparatus 8 (process 3). As a result, the working space shown by the mouse can always be brought to the front screen, and the operating efficiency of the image display can be further improved.

4 Claims, 12 Drawing Sheets

FOREIGN PATENT DOCUMENTS

| | | | |
|---|---|---|---|
| JP | 09-026832 | * | 1/1997 |
| JP | 9-258705 | | 10/1997 |
| JP | 9-269886 | | 10/1997 |
| JP | 10-333653 | | 12/1998 |
| JP | 2000-148080 | | 5/2000 |
| JP | 2000-148112 | | 5/2000 |
| JP | 2000-352962 | | 12/2000 |
| JP | 2001-67055 | | 3/2001 |
| JP | 2001-147679 | | 5/2001 |

* cited by examiner

FIG. 7A WHEN MOUSE IS AT FIRST DISPLAY SPACE
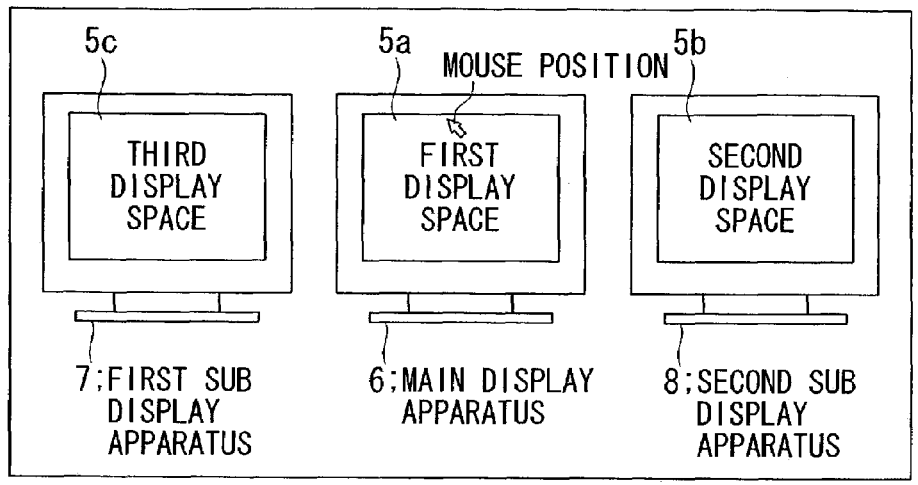
FIG. 7B WHEN MOUSE IS AT SECOND DISPLAY SPACE
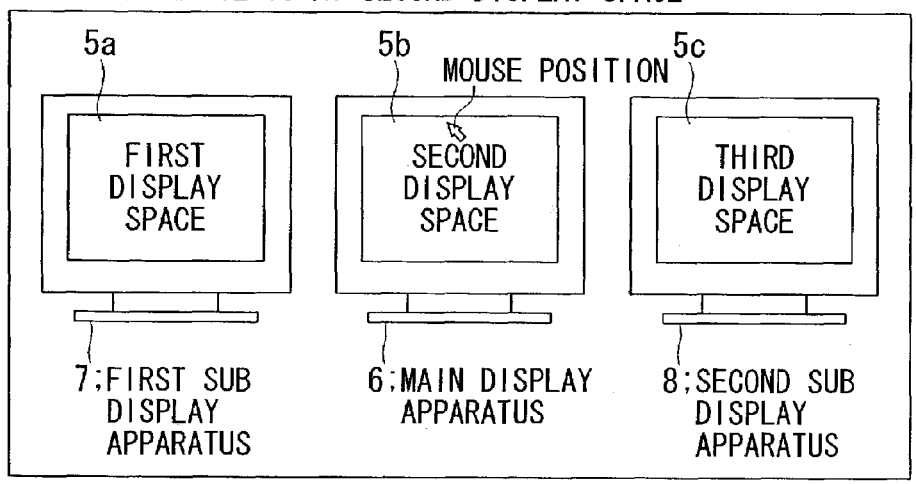
FIG. 7C WHEN MOUSE IS AT THIRD DISPLAY SPACE
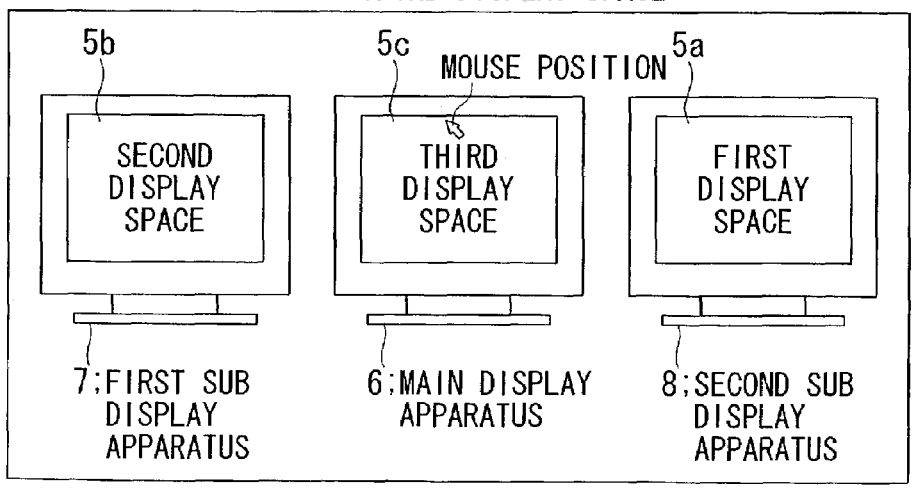

MULTI-DISPLAY CONTROL SYSTEM AND IMAGE DISPLAY APPARATUS

BACKGROUND OF THE INVENTION

1. Field of the Invention

The present invention relates to a multi-display control system for controlling an image signal generator and an image display apparatus, and more specifically relates to a multi-display control system and an image display apparatus, which control an image signal generator having a predetermined format used for example in a personal computer or a work station, and an image display apparatus configured to contain a display device such as a liquid crystal, a CRT, or a plasma display (PDP), and also perform image display control when multiple units of said image display apparatus are connected to said image signal generator.

2. Description of the Related Art

For example, in Japanese Unexamined Patent Application, First Publication No. 2001-67055 and the like, an image display apparatus is disclosed which can display images in multiple displays by interchanging various input signals with each other. FIG. 9 is a block diagram of a multi-display control system which controls displays, used in the image display apparatus disclosed in Japanese Unexamined Patent Application, First Publication No. 2001-67055. In this figure, a two input-type display apparatus 10 and a two input-type display apparatus 20 are connected to each other by a signal line 30.

A signal A is input to a connector 11 of the two input-type display apparatus 10, and in the same way a signal D is input to a connector 22 of the two input-type display apparatus 20. Moreover, a connector 12 and a connector 21 which are not in use, are connected to each other. In the display apparatus 10, when the user operates an interchange switch 16 to select the connector 11, the selector 14 connects the connector 11 to a display 15. As a result, the display 15 displays the image corresponding to the signal A. Also, when the user selects the connector 12 by means of the interchange switch 16, the selector 14 connects the connector 12 to the display 15. Moreover, that selection signal operates a selector 23 via the connector 12 and the connector 21. As a result, the selector 23 connects the connector 22 and the connector 21. This time, because the connector 12 and the connector 21 are already connected, as a result the display 15 can display the image corresponding to the signal D input to the connector 22. Also in the display apparatus 20, by operating the interchange switch 26, the operation can be performed in the same way as above. As a result, because the various signals input to the display apparatuses 10 and 20 can be interchanged with each other and displayed, a very effective supply of information can be performed during explanations and presentations and so on to customers.

Also, in Japanese Unexamined Patent Application, First Publication No. 2000-352962, a technique is disclosed in which a frame is selected to display an image, by using an index image signal for discriminating an image display apparatus, to discriminate an index. According to this technique, even if the number of display apparatuses increases, there is no increase in the number of connection cables and image signal generators for generating image signals. FIG. 10 is a block diagram of an index-type multi-display system as disclosed in Japanese Unexamined Patent Application, First Publication No. 2000-352962. In FIG. 10, multiple image display apparatuses 32 configured containing display devices such as liquid crystal panel, CRT, or plasma display (PDP) and the like, are connected to an image signal generator 31 which generates image signals having a predetermined format used in personal computers and work stations and so on. In the figure, each image display apparatus 32 has been given a different image display apparatus number 31, 32, to 3n.

The image signal generator 31 outputs as a composite signal; a net image signal which is actually displayed in the image display section of the liquid crystal panel or the like provided in the image display apparatus 32, a similar signal which corresponds to this net image signal, and a transmission index signal substituted for one part of the net image signal. The composite signal output from the image signal generator 31 is transmitted in parallel to the multiple connected image display apparatuses 32. The multiple image display apparatuses 32 comparison check the pre-allocated image display apparatus numbers with the transmission index signal, and only the conformed net image signal is displayed in the image display section of the appropriate image display apparatus 32. As a result, there is no increase in the number of image signal generating devices and connection cables, and arbitrary image can be displayed on any image display apparatus.

Furthermore, recently, because operating systems (OS) such as Windows (registered trademark) are supporting multi-display, multi-display applications have become fairly widespread. However, in the conventional multi-display described above, even if the image display process is performed as a hypothetical single-sheet page, the image actually displayed by the application is displayed separately on various different display apparatuses.

FIG. 1 is a conceptual view showing an operation of a conventional multi-display system, showing a state in which a hypothetical single-sheet page image is displayed separately on multiple image display apparatuses. As shown in FIG. 1, even when processed as a hypothetical single-sheet page 5 within the computer, the display actually displayed by the application is fixed, and due to performing operations by displaying multiple applications on the screens of multiple image display apparatuses 32, when the application in use changes, the display in use (that is, the image display apparatus 32) changes also. Therefore, a working space depending on the application in use is not displayed on the image display apparatus 32 which faces to an operator, and it becomes necessary for the operator to move in front of each image display apparatus 32. Also, in the multi-display control system of the image display apparatus disclosed in Japanese Unexamined Patent Application, First Publication No. 2001-67055, it is necessary for the user to operate a switch to interchange the display, and when three or more display apparatuses are being used, it is necessary to provide the connector for each displays, and the connection cables increase and also the multi-display control system becomes complicated.

The present invention takes the above problems into consideration, with the object of providing a multi-display control system with improved image display operating efficiency, which in a state where the multi-display is in use, the operation screen will come up on the operator's front screen even in the case where the application performing the operation changes, and it is not necessary for the operator to move the display image.

SUMMARY OF THE INVENTION

In order to achieve the above object, the multi-display control system of the present invention, in a multi-display control system which controls the display of an image display apparatus by connecting an image signal generator having a predetermined format to multiple image display apparatuses, is characterized in that there is provided; a pointing device detection device which detects a position of a pointing device, a working space assessment device which recognizes a screen in which operations are being performed based on the position detection result of said pointing device detection device, and a screen control device which interchanges a layout on the screen, either automatically or manually.

Also, the multi-display control system of the present invention, in a multi-display control system which controls the display of an image display apparatus by connecting an image signal generator having a predetermined format to multiple image display apparatuses, is characterized in that there is provided; an active window detection device which detects the position of an active window where the operator can perform operations, a working space assessment device which recognizes a screen in which operations are being performed based on the position detection result of the active window detection device, and a screen control device which interchanges a layout on the screen, either automatically or manually.

Moreover, the multi-display control system of the present invention is characterized in that furthermore, total display spaces are configured on one hypothetical single-sheet page, and a working space positioning device is provided which automatically or manually positions on the screen in front of an operator a working space in which the operator is performing operations, from among the total display spaces.

Also, the multi-display control system of the present invention is characterized in that the total display spaces are configured in a ring-shaped page.

Furthermore, the multi-display control system of the present invention is characterized in that a display apparatus selecting device which selects a display apparatus, is provided so as to always enable execution of main operations on a display apparatus having the greatest resolution, when combined with a display apparatus with a different display resolution.

According to the multi-display control system of the present invention, in a case where multiple applications are in use on different screens using a multi-display, conventionally it was necessary to move the working space to a separate image display apparatus accompanying changes in the application being used, however, with the multi-display control system of the present invention, the working space indicated by a pointing device such as the mouse can always be brought up on the front screen, the necessity for the operator to move image display apparatuses is reduced, and the operating efficiency of the image display can be further improved.

Also, according to the multi-display control system of the present invention, the image display space can be more specifically detected during operation, and when the active window is interchanged, that window can be displayed on the front screen of the main display apparatus. Moreover, according to the multi-display control system of the present invention, whenever the mouse is moved from the front screen of the main display apparatus to a first sub display apparatus on the left hand side, a first display space hitherto displayed on the first sub display apparatus can be displayed on the main display apparatus, and when the mouse is moved to a second sub display apparatus on the right hand side, a display space hitherto displayed on the second sub display apparatus can be displayed on the main display apparatus. At this time, because of the conformance of the interchange operation of the display spaces accompanying the movements of the pointing device such as the mouse, the efficiency of the operator's image display operations is further improved.

Moreover, according to the multi-display control system of the present invention, by having a high resolution on the main display apparatus which displays the actual operating screen, and having an economical low resolution on the sub display apparatuses used for reference, the entire system can be economically constructed with no loss in operating efficiency.

The image display apparatus of the present invention, in an image display apparatus which inputs multiple image signals to display a desired image signal on a screen, is characterized in that an image signal selected arbitrarily is output regardless of the types of image signals displayed on the screen. That is, according to the image display apparatus of the present invention, even when multiple image signals are input, a separate image signal can be output to the next stage display apparatus without depending on the image displayed on the image display apparatus thereof. As a result, various image signals can be displayed on the screen like a multi-display.

Also, the image display apparatus of the present invention, in an image display apparatus which inputs multiple image signals to display a desired image signal on a screen, is provided with; an image signal input device which inputs multiple image signals, a display image selecting device which selects an image signal for display on a screen from the multiple image signals input to the image signal input device, and a display device which displays on a screen an image signal selected by the display image selecting device. Moreover, the image signal input device is characterized in that a pre-set image signal is output, regardless of the image signal displayed on the display device. That is, according to the image display apparatus of the present invention, a separate image signal can be output without depending on the image displayed on the image display apparatus thereof, and therefore various image signals can be displayed on a single display system.

Also, the image display apparatus of the present invention, in an image display apparatus which inputs multiple image signals to display a desired image signal on a screen, is provided with; a display image selecting device which selects an image signal for display on a screen from the input multiple image signals, a display device which displays on a screen an image signal selected by the display image selecting device, and an output signal selecting device which selects a desired image signal from the input multiple image signals to output. Moreover, the output signal selecting device is characterized in that a pre-set image signal is output, regardless of the image signal displayed on the display device. That is, according to the image display apparatus of the present invention, the user can select the desired image signal to be displayed on a separate display device, without depending of the image signal displayed by the display device.

Furthermore, the image display apparatus of the present invention is characterized in that there is further provided an image signal discriminating device which discriminates between the types of input multiple image signals, and the output signal selecting device outputs the image signal discriminated by the image signal discriminating device. That is, according to the image display apparatus of the present invention, if the image signal discriminating device is pre-set to discriminate the desired image signals, the user's desired image signal can be automatically selected and output by the image signal discriminating device, even if the user does not select each individual image signal.

Also, the image display apparatus of the present invention is characterized in that the image signal discriminating device can freely set the image signal discrimination contents, by setting arbitrary selection conditions. That is, according to the image display apparatus of the present invention, if the image signal discrimination contents are set to the user's preference, the user's preferred image signals can always be output.

Also, the image display apparatus of the present invention is characterized in that an index image signal having a pre-set index signal is contained in the input multiple image signals, and the image signal input device outputs the index image signal regardless of the image signal displayed on the display device. That is, according to the image display apparatus of the present invention, just the signal containing the index can be output to the next stage display apparatus, without depending on the image displayed on the display apparatus thereof, even when multiple image signals are input. Because the index image signal is transmitted to the next stage display apparatus through an index dedicated input section, just the index image signal containing the index can be reliably output with respect to the next stage display apparatus even when the display apparatus inputs multiple image signals of different types, without depending on the image displayed on the display apparatus thereof. Also, conversely, just the signals not containing the index can be output.

Also, the index display apparatus of the present invention is characterized in that index image signals having a pre-set index signal are contained in the input multiple image signals, and the output signal selecting device outputs the index image signals regardless of the image signal displayed by the display device.

That is, according to the image display apparatus of the present invention, by providing an output signal selecting section to select an arbitrary image signal, then even if an index dedicated input section is not provided, by the user selecting an image signal containing the index, as the output signal, the signal containing the index can be selectively output to the next stage display apparatus without depending on the selection contents of the display image of the display apparatus. Also, if an index discriminating section is provided, then even if the user does not select the signal containing the index in the output signal, because the index discriminating section automatically discriminates whether or not the index is present, regardless of the selection of the display image in the display apparatus, the image signal containing the index can be output to the next stage display apparatus.

BRIEF DESCRIPTION OF THE DRAWINGS

FIG. 7A is a conceptual diagram showing an operation of a multi-display control system according to the third embodiment of the present invention, showing a state when a mouse is in a first display space.

FIG. 7B is a conceptual diagram showing an operation of a multi-display control system according to the third embodiment of the present invention, showing a state when the mouse is in a second display space.

FIG. 7C is a conceptual diagram showing an operation of a multi-display control system according to the third embodiment of the present invention, showing a state when the mouse is in a main display space.

DESCRIPTION OF THE PREFERRED EMBODIMENTS

Hereunder is a detailed description of several embodiments of a multi-display control system according to the present invention, with reference to the drawings. The multi-display control system according to the present invention is characterized in that when the multi-display is being used, a screen to be operated always comes up on the operator's front even if the application carrying out an operation changes. Because of this, even if the application is changed, there is no need for the operator to move the display screen.

First Embodiment

Figure 1:
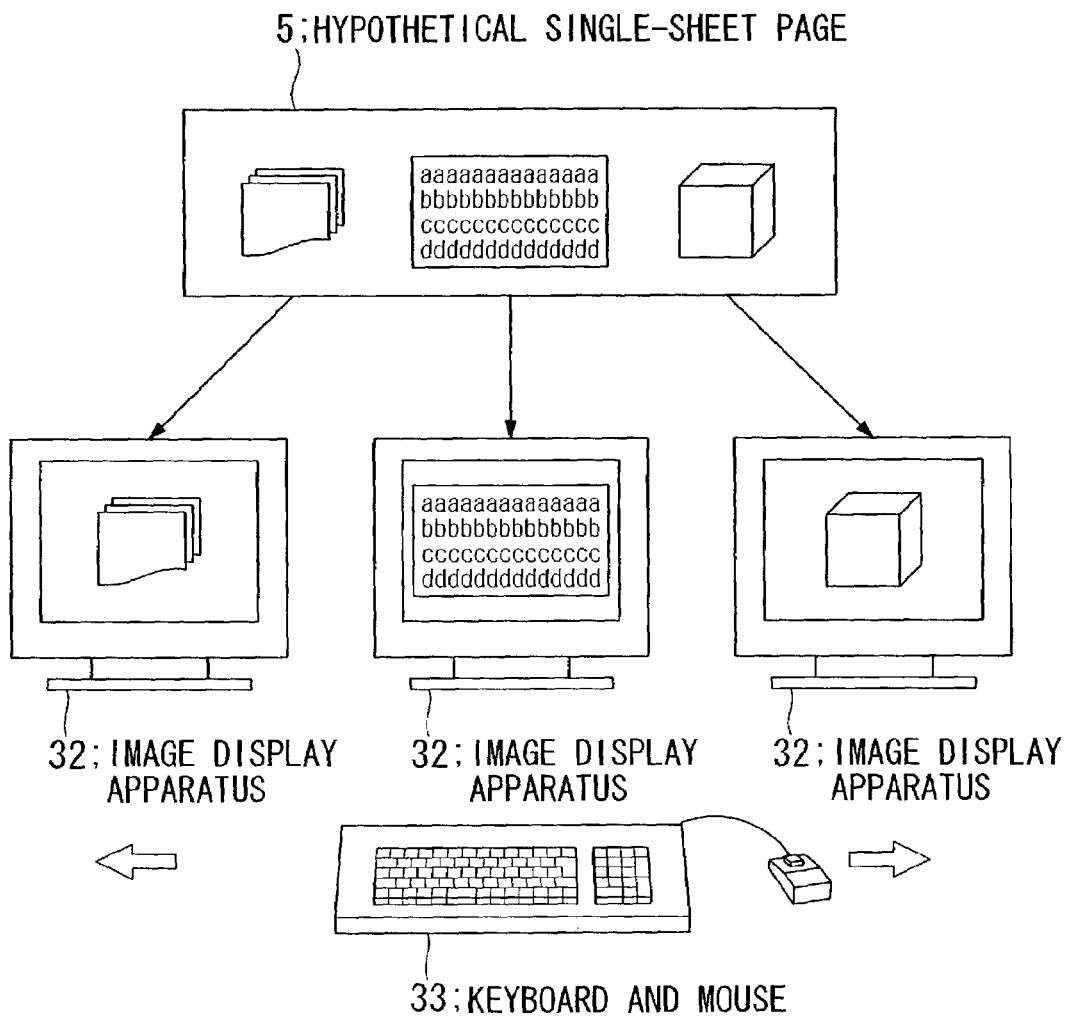
FIG. 1 is a conceptual view showing an operation of a conventional multi-display system, showing a state in which a hypothetical single-sheet page image is displayed separately on multiple image display apparatuses.
Figure 2:
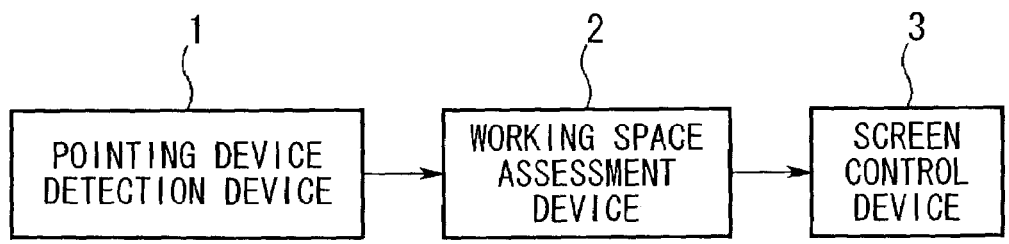
FIG. 2 is a block diagram showing a configuration of a multi-display control system according to a first embodiment of the present invention.

FIG. 2 is a block diagram showing a configuration of a multi-display control system according to a first embodiment of the present invention. In FIG. 2, the multi-display control system comprises; a pointing device detection device 1 which detects the position of pointing devices such as a mouse, a touch pad, or a track ball, a working space assessment device 2 which assesses the working space where the user is performing an operation based on the position detection results from the pointing device detection device 1, and a screen control device 3 which interchanges the position of the screen automatically or manually so that the working space assessed by the working space assessment device 2 is displayed on a display apparatus which faces to the operator.

Figure 3:
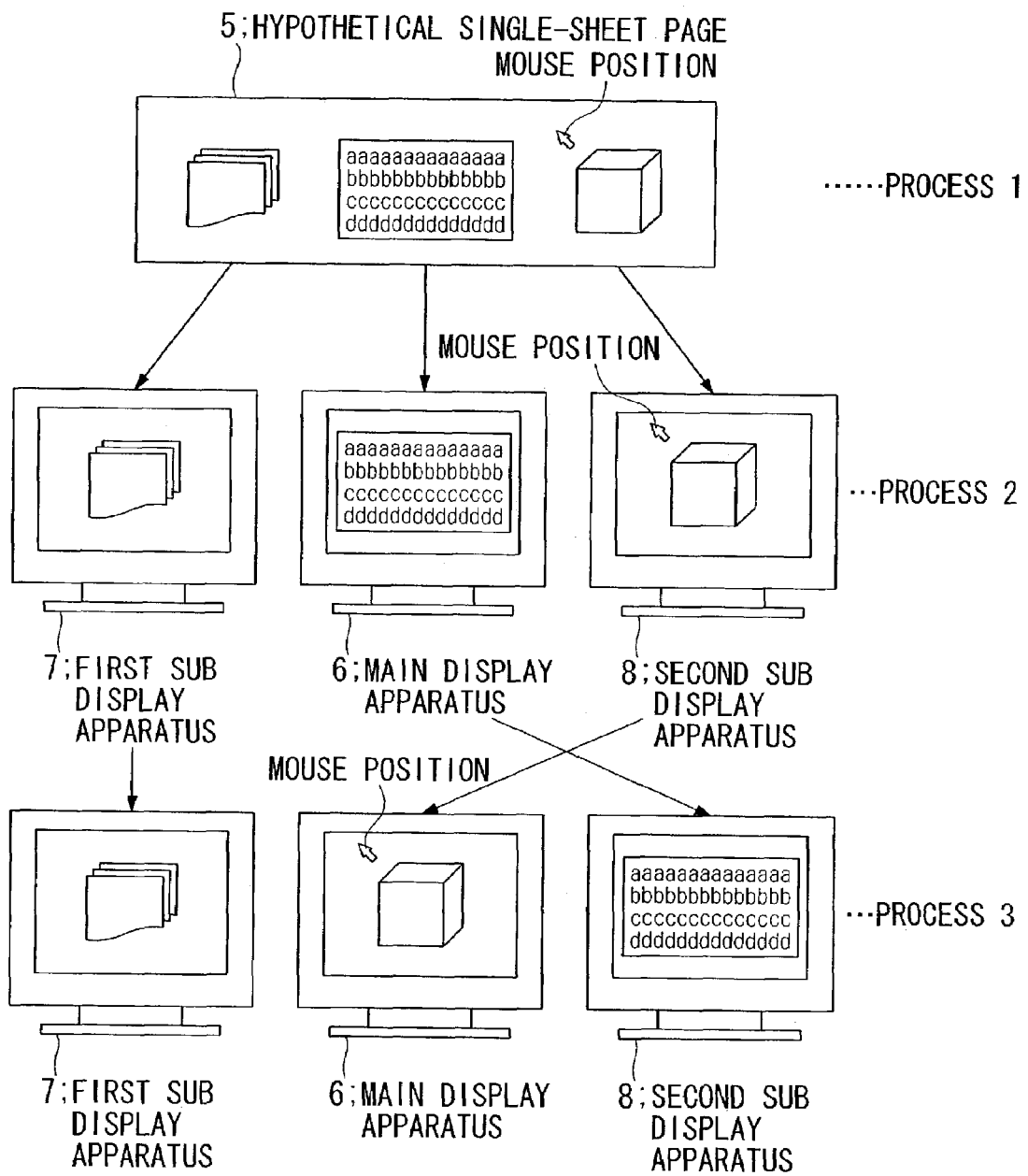
FIG. 3 is a conceptual view showing a display control method for a multi-display control system according to the first embodiment of the present invention.

FIG. 3 is a conceptual view showing a display control method for a multi-display control system according to the first embodiment of the present invention. In FIG. 3, the flow of processes of an image display in a multi-display control system comprised of three image display apparatuses is shown. The operator positions in front of a main display apparatus 6 which faces to the operator to perform operation. A first sub display apparatus 7 is arranged on the left of the main display apparatus 6, and a second sub display apparatus 8 is arranged on the right of the main display apparatus 6. Hereunder, the flow of processes of the image display will be explained with reference to FIG. 2 and FIG. 3.

Beforehand, the operator selects the conditions for image detection at the start of operation of the pointing device detection device 1 in FIG. 2, to either automatic or manual. In the case where the conditions for image detection are set to automatic, image detection is continuously performed, and in the case where the conditions for image detection are set to manual, image detection is performed when events are generated such as when the mouse is clicked or dragged, and when any one of keyboard keys which is preset is depressed. When the conditions for image detection have been met, the pointing device detection device 1 detects where the position of a pointing device such as the mouse is on a hypothetical single-sheet page 5 (process 1).

Next, the working space assessment device 2 assesses which image display apparatus the mouse is positioned on, from the position detection result of the pointing device detection device 1. In the example in FIG. 3, the mouse is shown as being positioned on the second sub display apparatus 8 (process 2). The screen control device 3, in the case where the operating screen assessed by the working space assessment device 2 is not the main display apparatus 6, exchanges the sub display apparatus (in the example of FIG. 3 the second sub display apparatus 8) screen contents and the main display apparatus 6 screen contents and displays on the various image display apparatuses. That is, the screen contents of the second sub display apparatus 8 are transformed to the main display apparatus 6, and the screen contents of the main display apparatus 6 are transformed to the second sub display apparatus 8 (process 3).

The process in which the screen control device 3 changes between the screen contents of the image display apparatus can be easily executed by renewing just the transmission index signal, if for example a multi-display system of the index type as published in Japanese Unexamined Patent Application, First Publication No. 2000-352962 mentioned in the prior art is applied. That is, in the image signal generator, one part of the index signal which discriminates the image display apparatus is substituted in the predetermined position of the image signal which has multiple pages, and in the image display apparatuses if the image display apparatus which should discriminate the index signal and display the image is selected, the screen contents of the image display apparatus can be easily exchanged.

When the image display process is performed as above, when using the multi-display and using multiple applications on different screens, conventionally it was necessary to move the working space to a separate image display apparatus in line with the change of application in use. However according to the multi-display control system of the present invention, the working space as shown by the pointing devices such as the mouse can always be brought on the screen which faces to the operator, the operator moves between the image display apparatuses less often, and the operating efficiency of the image display can be improved.

Second Embodiment

Figure 4:
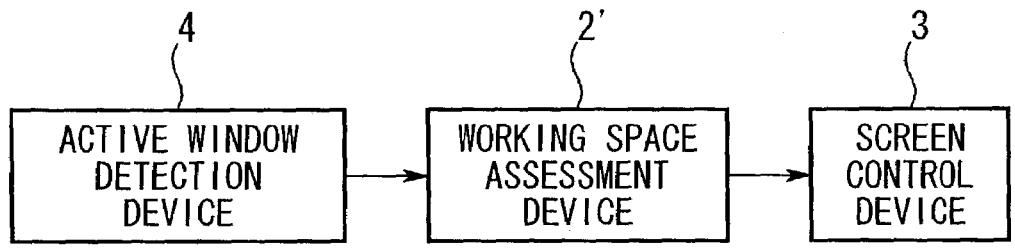
FIG. 4 is a block diagram showing a configuration of a multi-display control system according to a second embodiment of the present invention.

FIG. 4 is a block diagram showing a configuration of a multi-display control system according to a second embodiment of the present invention. In FIG. 4 the multi-display control system comprises an active window detection device 4 which detects the position of the active window which the operator can operate, a working space assessment device 2' which assesses the working space where the user is performing operations from the position detection result of the active window detection device 4, and a screen control device 3 which interchanges the screen position either automatically or manually so that the working space assessed by the working space assessment device 2' comes in front of the operator.

In standard Windows (registered trademark), there is only one active window, that is to say a window where the operator can perform operations, and by clicking the mouse on the Windows (registered trademark) or by clicking the titles on the menu bar, specification of the active window can be performed. Here, with regard to what the operator puts in the position of the active window, when this can be preselected from among; the original coordinates of the window (usually in the upper left coordinate of the window), the center coordinates of the window, the position of the cursor, and the center coordinates of the window within a working space having the maximum surface area in the case where the window extends over multiple working spaces, and so on, then the position of the window to be displayed can be specified even when the window extends over multiple working spaces.

In FIG. 4, the active window detection device 4, taking as a position of the active window the origin coordinates and cursor coordinates and so on of the active window, detects where it is positioned on the hypothetical single-sheet page 5 shown in FIG. 3 (process 1). As for subsequent processes, in the same way as in FIG. 3 in the first embodiment, the working space assessment device 2' assesses which image display apparatus the mouse is positioned on, from the position detection results of the active window detection device 4 (process 2). The screen control device 3, in the case where the operating screen as assessed by the working space assessment device 2' is not the main display apparatus 6, exchanges the screen contents of the sub display apparatus (that is, the second sub display apparatus 8 in the example in FIG. 3) with the screen contents of the main display apparatus 6, and displays them on each image display apparatus. That is, the screen contents of the second sub display apparatus 8 are transformed to the main display apparatus 6, and the screen contents of the main display apparatus 6 are transformed to the second sub display apparatus 8 (process 3).

When the image display process is performed as above, the image display working space during operation can be detected even more specifically, and when the active window is interchanged, that window can be displayed on the front screen of the main display apparatus.

Third Embodiment

Figure 5:
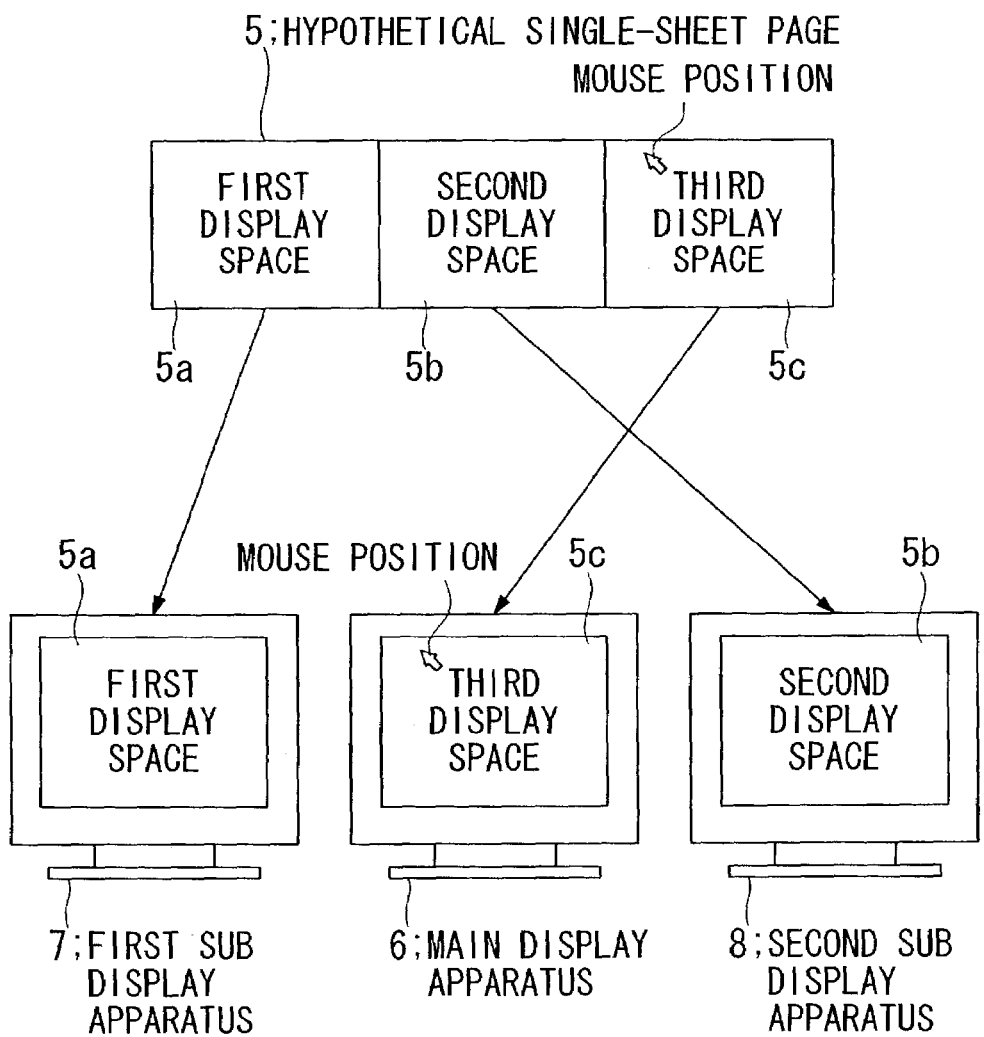
FIG. 5 is a conceptual view showing a display control method for a multi-display control system according to the third embodiment of the present invention.

FIG. 5 is a conceptual view showing a display control method for a multi-display control system according to the first embodiment of the present invention. As shown in FIG. 5, the hypothetical single-sheet page 5 space is separated to the first display space 5a, the second display space 5b, and the third display space 5c by the screen control device 3. When the mouse pointer is in the third display space 5c, the third display space 5c is displayed on the main display apparatus 6, and the second display space 5b is displayed on the second sub display apparatus 8. The first display space 5a remains displayed as before in the first sub display apparatus 7.

Next, by moving the mouse from left to right, while the actual display apparatus puts the main display apparatus 6 on the front screen, and a first sub display apparatus 7 and a second sub display apparatus 8 are provided on the left and right, the mouse is moved up to the right edge of the main display apparatus 6, that is to say to the right edge of the hypothetical single-sheet page 5, the mouse will not move any further. Also, when the mouse is moved through the left edge of the main display apparatus 6 to the first sub display apparatus 7, it may seem to the operator as though the mouse has moved to the first display space 5a, but in fact the mouse has moved to the second display space 5b on the hypothetical single-sheet page 5, the second display space 5b is displayed on the main display apparatus 6, and the third display space 5c is displayed on the second sub display apparatus 8. This will occur in the same way even when the display spaces are divided into more than three.

Figure 6:
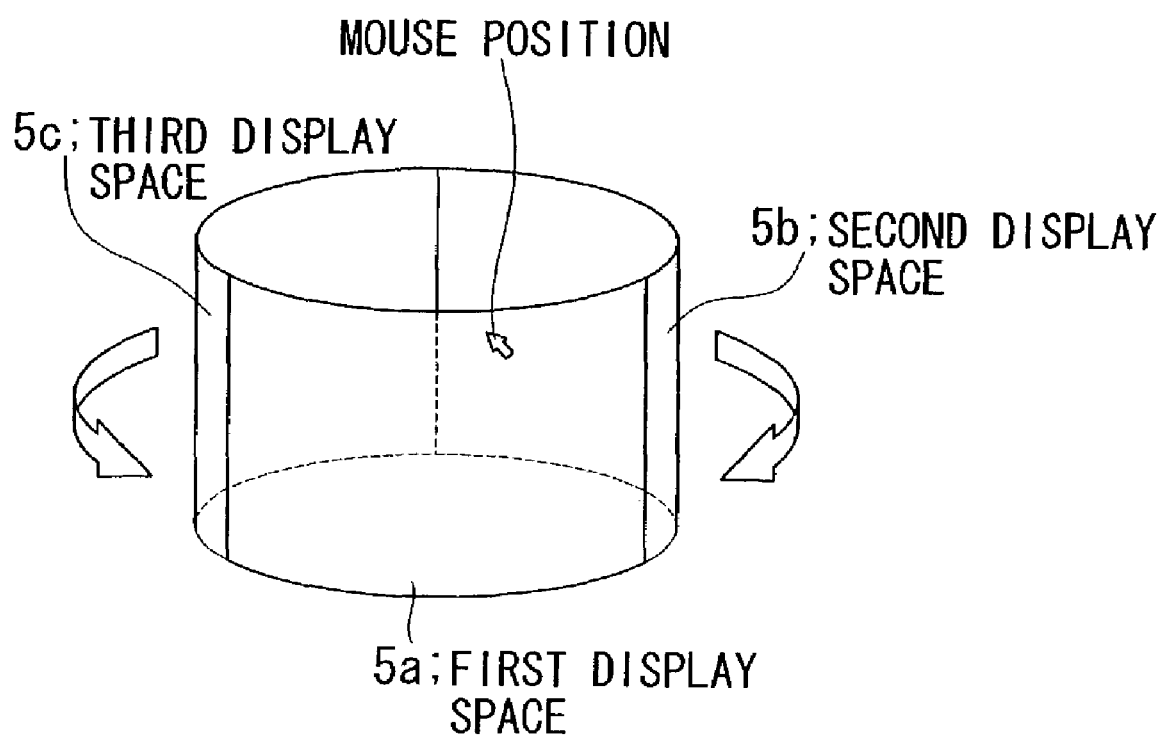
FIG. 6 is a ring-shaped page block diagram showing a hypothetical page configuration of a multi-display control system according to a third embodiment of the present invention.

FIG. 6 is a ring-shaped page block diagram showing a hypothetical page configuration of the multi-display control system according to the third embodiment of the present invention. When the page configuration is configured in a ring shape as in FIG. 6, a configuration is formed in which the right edge of the third display space 5c continues into the left edge of the first display space 5a, and the right edge of the first display space 5a continues into the left edge of the second display space 5b.

FIGS. 7A to 7C is a conceptual diagram showing the operation of a multi-display control system according to the third embodiment of the present invention, showing a state when (a) the mouse is in the first display space, (b) the mouse is in the second display space, and (c) the mouse is in the third display space. In the case of a ring-shaped page configuration such as shown in FIG. 6, when the mouse pointer is in the first display space 5a as shown in of FIG. 7A, the first display space 5a is displayed in the main display apparatus 6, the third display space 5c is displayed in the first sub display apparatus 7, and the second display space 5b is displayed in the second sub display apparatus 8. In the same way, when the mouse pointer is in the second display space 5b as shown in FIG. 7B, the second display space 5b is displayed in the main display apparatus 6, the first display space 5a is displayed in the first sub display apparatus 7, and the third display space 5c is displayed in the second sub display apparatus 8.

When the mouse pointer is in the third display space 5c as shown in FIG. 7C, the third display space 5c is displayed in the main display apparatus 6, the second display space 5b is displayed in the first sub display apparatus 7, and the first display space 5a is displayed in the second sub display apparatus 8 respectively. Also in the case where the multi-display system is structured in an up and down direction, the page is configured in a ring shape in an up and down direction in the same way.

According to the third embodiment of a multi-display control system, whenever the mouse is moved from the front page of the main display apparatus 6 to the first sub display apparatus 7 on the left hand side, the first display space hitherto displayed on the first sub display apparatus 7, can be displayed on the main display apparatus 6, and also, whenever the mouse is moved to the second sub display apparatus 8 on the right hand side, the display space hitherto displayed on the second sub display apparatus 8 can be displayed on the main display apparatus 6. In this way, because of the conformance of the interchange operation of the display spaces accompanying the movements of the pointing devices such as the mouse, the efficiency of the operator's image display operations is further increased.

Fourth Embodiment

Figure 8:
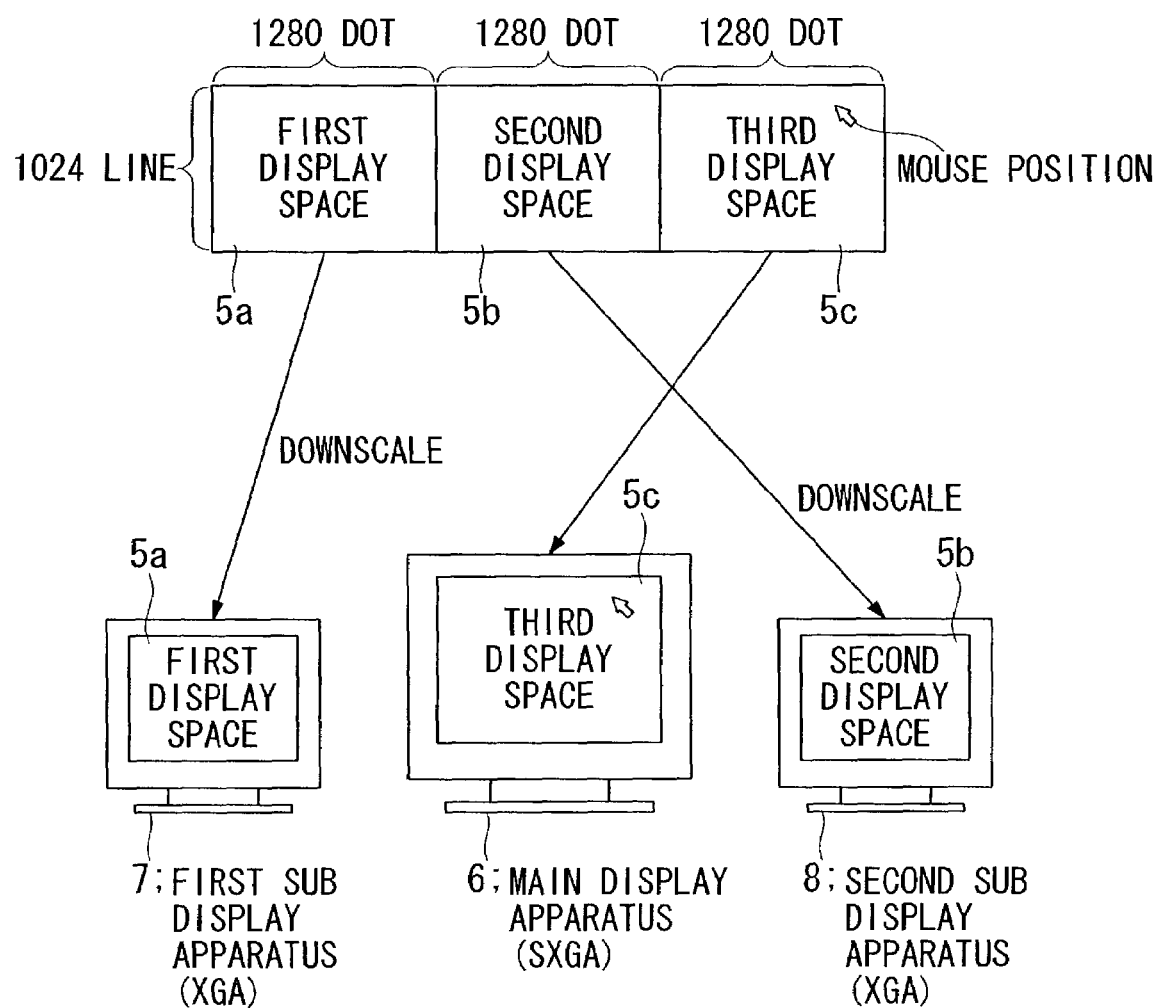
FIG. 8 is a conceptual diagram showing an operation of a multi-display control system according to a fourth embodiment of the present invention.
Figure 9:
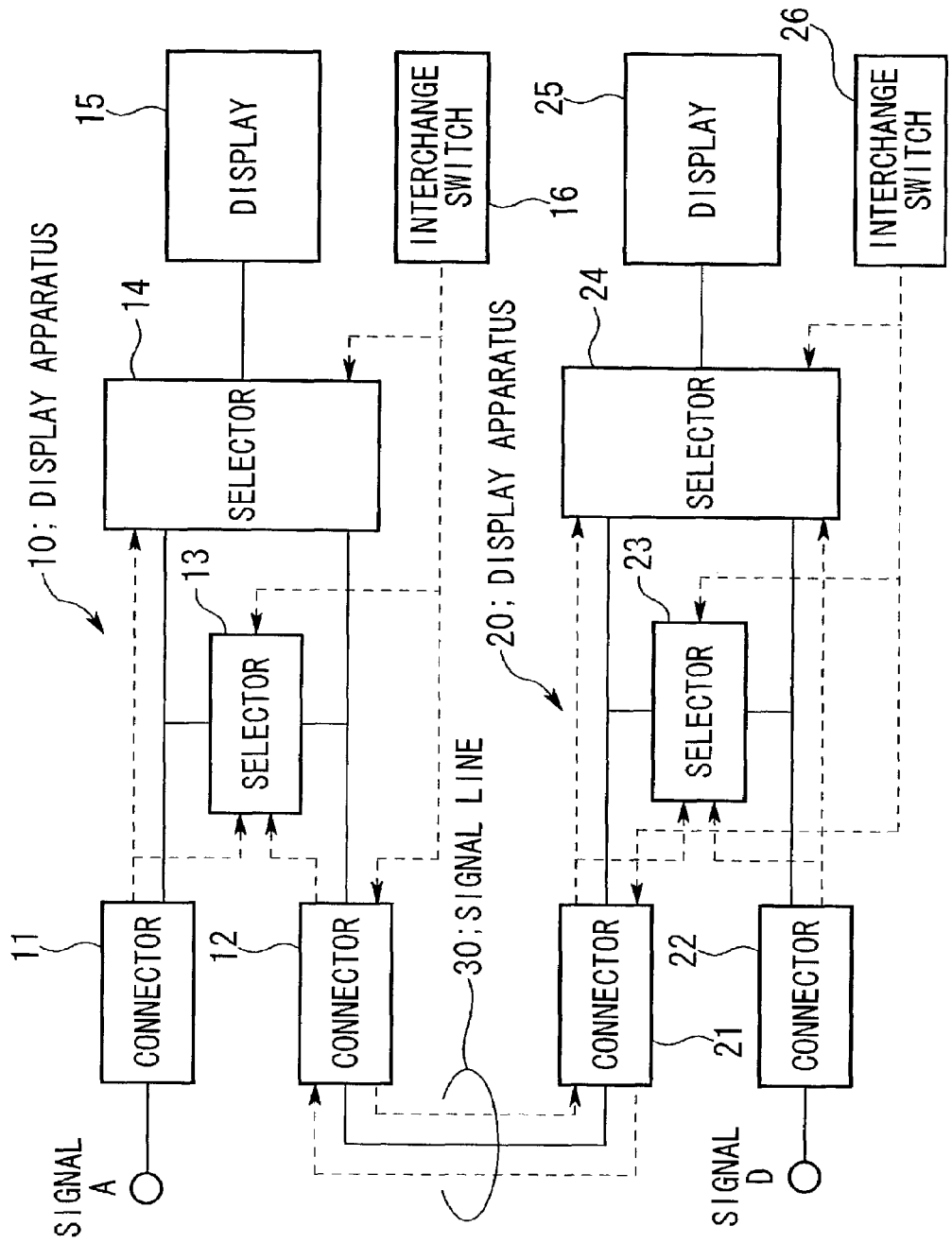
FIG. 9 is a block diagram of a multi-display control system which controls displays in an image display apparatus disclosed in Japanese Unexamined Patent Application, First Publication No. 2001-67055.
Figure 10:
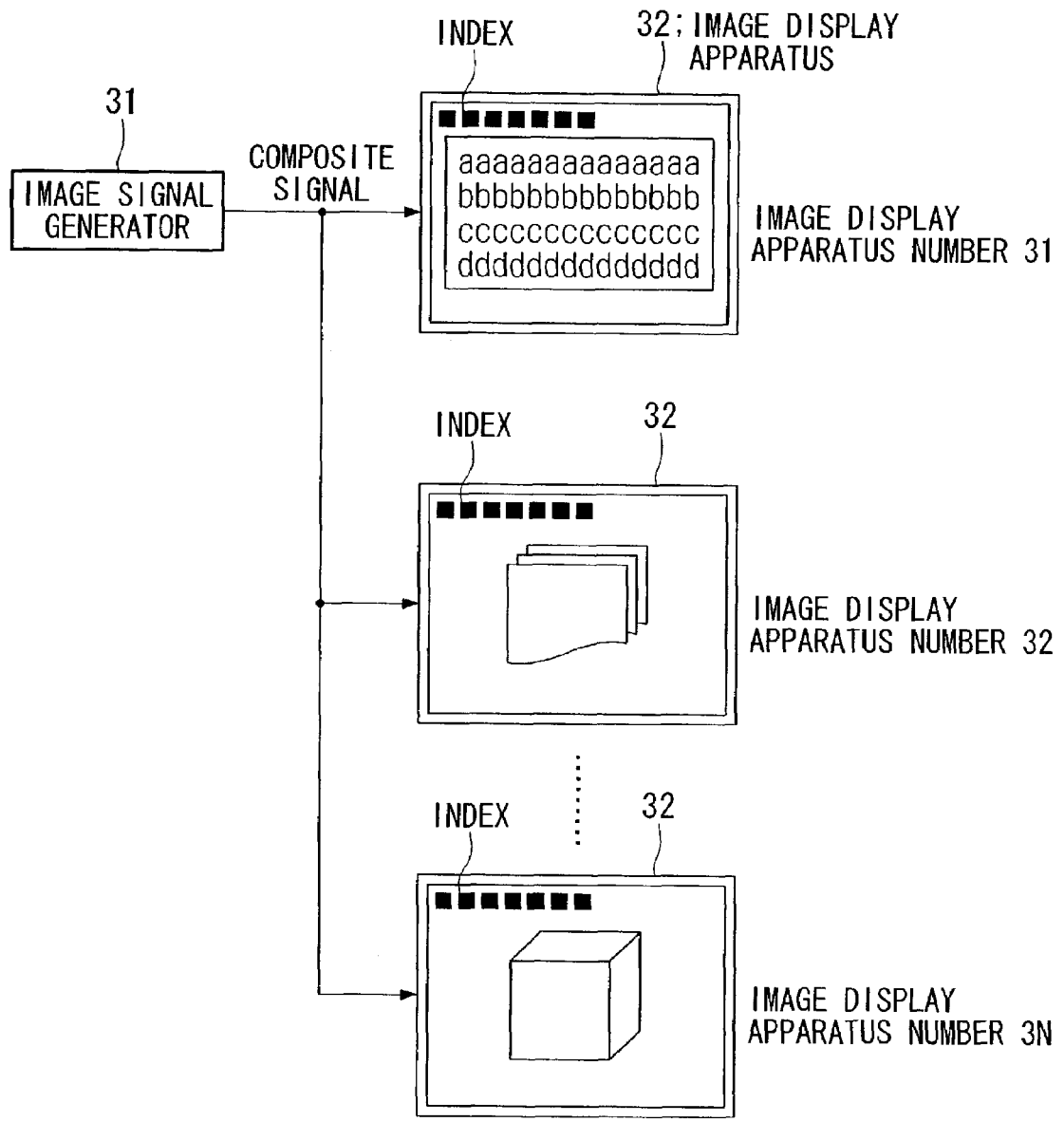
FIG. 10 is a block diagram of an index-type multi-display system as disclosed in Japanese Unexamined Patent Application, First Publication No. 2000-352962.

The efficiency of the screen display operations increases to the extent that the display becomes a large screen and has high resolution, but LCD panels and PDP become valuable to the extent that they have high resolution. FIG. 8 is a conceptual diagram showing the operation of a multi-display control system according to a fourth embodiment of the present invention. That is, FIG. 8 is an example of where a multi-display control system of the present invention is executed in the form of one main display apparatus unit with a panel having a resolution of SXGA (1280 dots×1024 lines), and two sub display apparatuses 7 and 8 with a panel having a resolution of XGA (1024 dots×768 lines), with respect to three display spaces (that is, the first display space 5a, the second display space 5b, and the third display space 5c) having a resolution of SXGA.

Because the sub display apparatuses 7 and 8 display a simplified display where the SXGA display space is downscaled to the XGA, the sub display apparatuses 7 and 8 are not suitable for displaying detailed word processing operations and the like, but are sufficient to be used for reference. By moving the mouse and changing the active window, the display space that the operator is actually operating is automatically displayed by the detailed main display apparatus.

According to the fourth embodiment of a multi-display control system, by having a high resolution on the main display apparatus showing the actual operating screen, and having an economical low resolution on the sub display apparatuses used for reference, the entire system can be economically constructed with no loss in operating efficiency.

The above embodiments are one example to explain the present invention, although the present invention is not limited to the above embodiments and other modifications are possible within the scope of the gist of the invention. For example, in each of the above embodiments, a case in which three image display spaces are displayed respectively on three image display apparatuses has been described, but without being limited to this, it is also possible to display n (more than three) image display spaces on n image display apparatuses.

Next is a description of fifth to seventh embodiments regarding a multi-display apparatus having an index function capable of being applied to the multi-display system described in the first to fourth embodiments above.

First is a description of a conventional image display apparatus having an index function.

Figure 15:
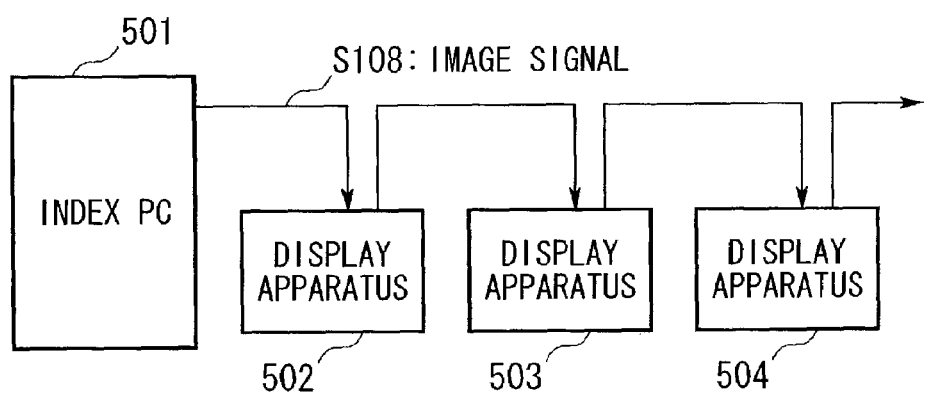
FIG. 15 is a block diagram showing a conventional display apparatus, which outputs an index image signal.

FIG. 15 is a block diagram showing a conventional display apparatus, which outputs an index image signal. That is, FIG. 15 shows the connection configuration of a conventional display apparatus having an index function such as disclosed in Japanese Unexamined Patent Application, First Publication No. 2000-352962 and the like.

In FIG. 15, an image signal S108 containing an index is input to a display apparatus 502 from an index PC 501 being a personal computer (hereunder referred to as a PC) which transmits the image signal containing the index signal.

Moreover, the display apparatuses 502, 503, and 504 are connected in a daisy chain.

When the image signal S108 containing the index is input into the display apparatus 502 by the index PC 501, the display apparatus 502 outputs that image signal S108 to the display apparatus 503. In the same way, the display apparatus 503 outputs the image signal S108 to the display apparatus 504, and the display apparatus 504 further outputs the image signal S108 to the next stage display apparatus. Consequently, each display apparatus 502, 503, 504, and so on can receive the image signal S108 containing the index, and can make each index function work normally.

Figure 14:
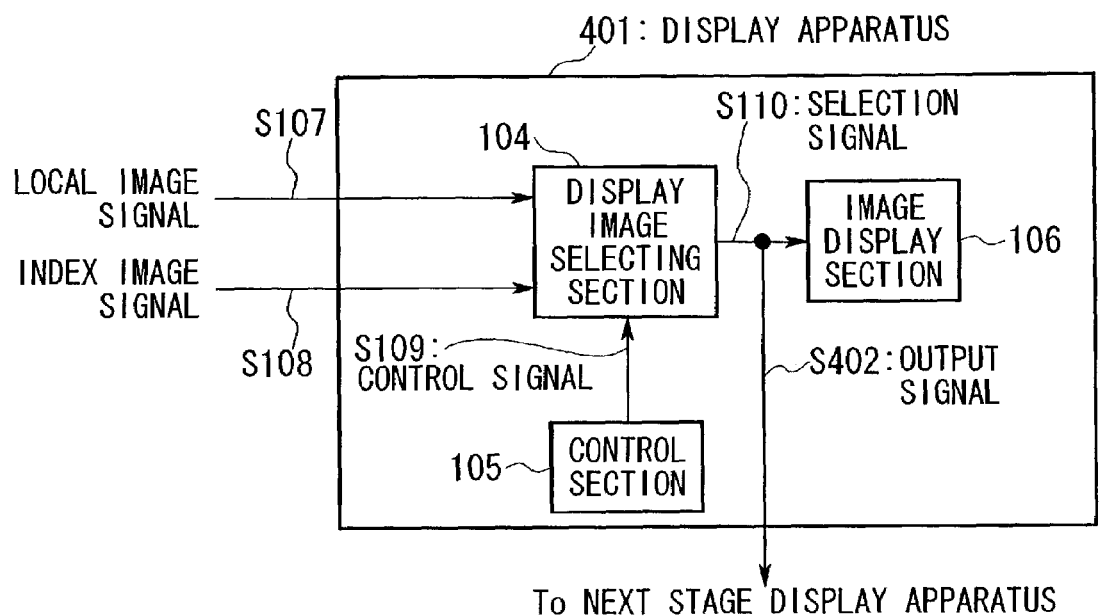
FIG. 14 is a block diagram of a conventional display apparatus provided with two input terminals, which outputs an index image signal.

However, with the technology of Japanese Unexamined Patent Application, First Publication No. 2000-352962 mentioned above, it is not possible to display an image signal which does not contain an index from another local PC merely by displaying the image signal containing the index. As a method to address this, a display apparatus provided with two input terminals in order to display an image signal of a local PC is known. FIG. 14 is a block diagram of a conventional display apparatus provided with two input terminals which outputs an index image signal. In FIG. 14, a display apparatus 401 comprises a display image selecting section 104, a control section 105, and an image display section 106, and a local image signal S107 and an image signal containing an index (hereunder referred to as an index image signal) S108 are input to the display apparatus 401. Moreover, a control signal S109 is transmitted from a control section 105 to the display image selecting section 104, a selection signal S110 is transmitted from the display image selecting section 104 to the image display section 106, and an output signal S402 is transmitted from the display image selecting section 104 to the monitor of the next stage display apparatus.

Next is a description of the operation of the display apparatus in FIG. 14. The local image signal S107 not containing an index, and the index image signal S108 are input to the display image selecting section 104. When this happens, the display image selecting section 104 selects the selection signal S110, based on the control signal S109 from the control section 105, and transmits it to the image display section 106. As a result, the image display section 106 can display the image signal which was selected based on the selection signal S110. However, if the output signal S402 which is output to the next stage display apparatus selects the index image signal S108, because one part of the selection signal S110 transmitted to the image display section 106 is output, the output signal 402 will also contain the index. However, if the local image signal 107 not containing an index is selected, the signal not containing an index will be output in the output signal S402.

Figure 16:
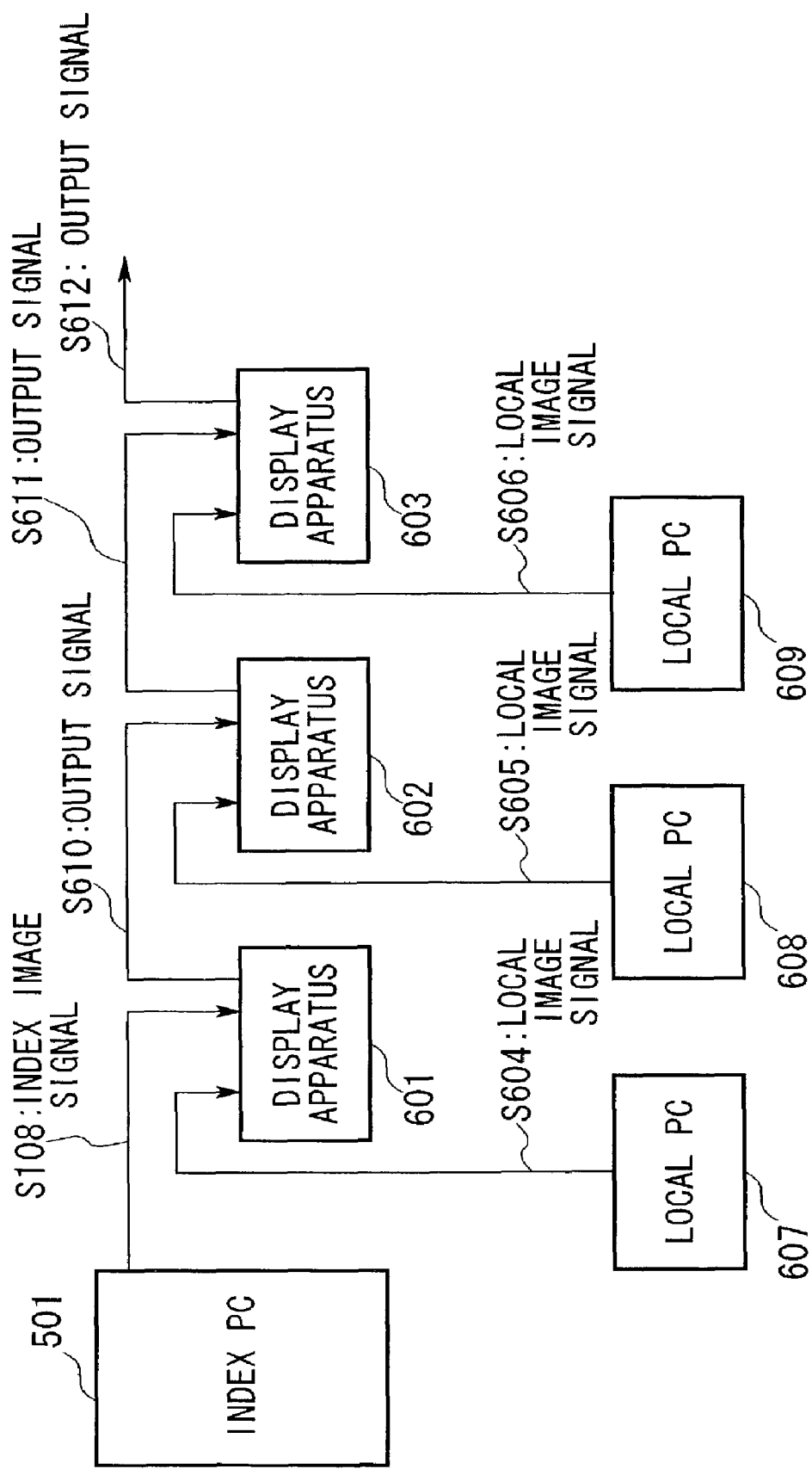
FIG. 16 is a connection diagram for a conventional display apparatus having an index function provided with 2 input terminals and one output terminal.

A more specific description can be performed using FIG. 16. FIG. 16 is a connection diagram of a conventional display apparatus having an index function provided with 2 input terminals and one output terminal. In FIG. 16, display apparatuses 601, 602, and 603 having an index function are connected in a daisy chain to an index PC 501. Moreover, local PCs 607, 608, and 609 which each performs operations individually, are separately connected to each display apparatus 601, 602, and 603. Next, local image signals S604, S605, and S606 without an index signal added, are input from each local PC 607, 608, and 609 to the corresponding display apparatuses 601, 602, and 603. On the other hand, an index image signal S108 from the index PC 501 is transmitted as output signals S610, S611 and S612 to the display apparatuses 601, 602, and 603 which are connected in a daisy chain.

Furthermore, the parts corresponding to FIG. 15 are given the same numbers and repeated description is omitted. By means of the connection configuration of the display apparatus as shown in FIG. 16, the user performs each operation on the local PC by obtaining data from the common index signals.

The following embodiment provides a display apparatus which can reliably output the index signal to the next stage even if the image signal displayed in the display apparatus changes.

Fifth Embodiment

Figure 11:
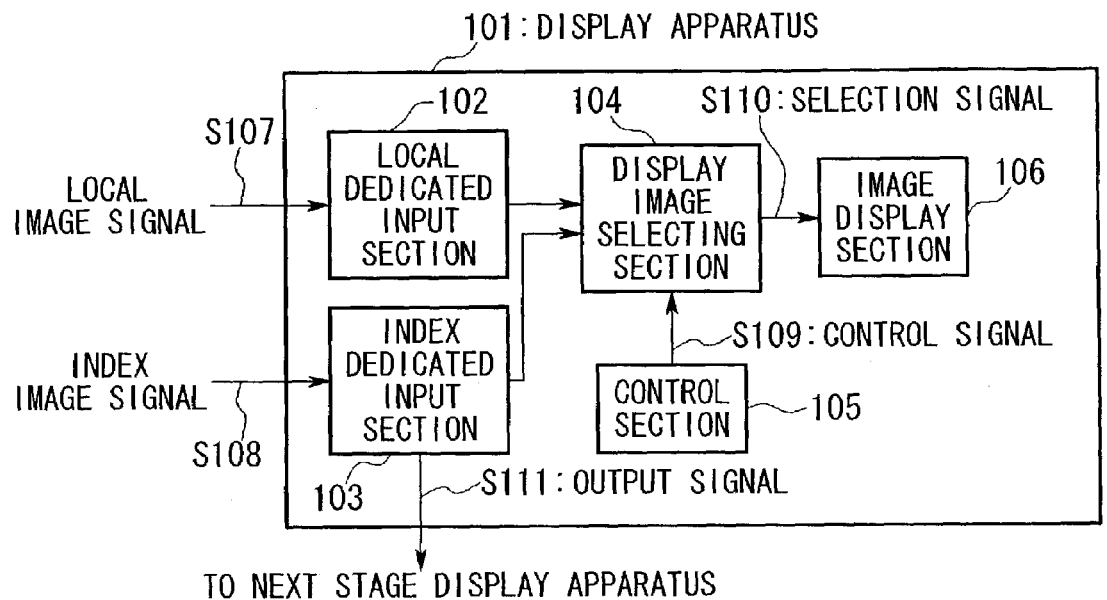
FIG. 11 is a block diagram showing a configuration of a display apparatus having an index function according to a fifth embodiment of the present invention.

FIG. 11 is a block diagram showing a configuration of a display apparatus having an index function according to a fifth embodiment of the present invention. In FIG. 11, a display apparatus 101 comprises a local dedicated input section 102, and index dedicated input section 103, a display image selecting section 104, a control section 105, and an image display section 106. That is, with respect to the configuration of the conventional display apparatus 401 shown in FIG. 14, the configuration of the display apparatus 101 shown in FIG. 11 has the addition of the local dedicated input section 102 and the index dedicated input section 103. Also, the local image signal S107 is input to the local dedicated input section 102, and the index image signal S108 containing the index is input to the index dedicated input section 103. Moreover, the control signal S109 is transmitted from the control section 105 to the display image selecting section 104, the selection signal S110 is transmitted from the display image selecting section 104 to the image display section 106, and the output signal S111 is transmitted from the index dedicated input section 103 to the monitor of the next stage display apparatus.

Next is a description of the operation of the above configuration. When the local image signal S107 is input to the local dedicated input section 102 and the index image signal S108 is input to the index signal dedicated input section 103, the local image signal S107 and the index image signal S108 from each are input to the common display image selecting section 104.

Here, when the user uses a switch or the like (not shown) to select an image signal which they want to display on the display apparatus 101, the control signal S109 is input from the control section 105 to the display image selecting section 104. The display image selecting section 104 selects either the local image signal S107 or the index image signal S108 as the output signal S110, based on this control signal S109. Next, by displaying the selected selection signal S110 on the image display section 106, the image selected by the user is displayed on the screen of the display apparatus 101.

On the other hand, the output signal S111 output from the index dedicated input section 103 to the next stage display apparatus is the same signal as the index image signal S108 input to the index dedicated input section 103. Therefore, even if the user selects either the local image signal S107 or the index image signal S108 by means of the control section 105 to display on the image display section 106, the index image signal 108 can be reliably output to the next stage display apparatus as the output signal S111.

In this way, according to the configuration of the display apparatus in the fifth embodiment, because the index image signal is transmitted to the next stage display apparatus through the index dedicated input section, even when the display apparatus has input multiple image signals of different types, the index image signal containing the index can be reliably output with respect to the next stage display apparatus without depending on the image displayed on the display apparatus thereof.

Sixth Embodiment

Figure 12:
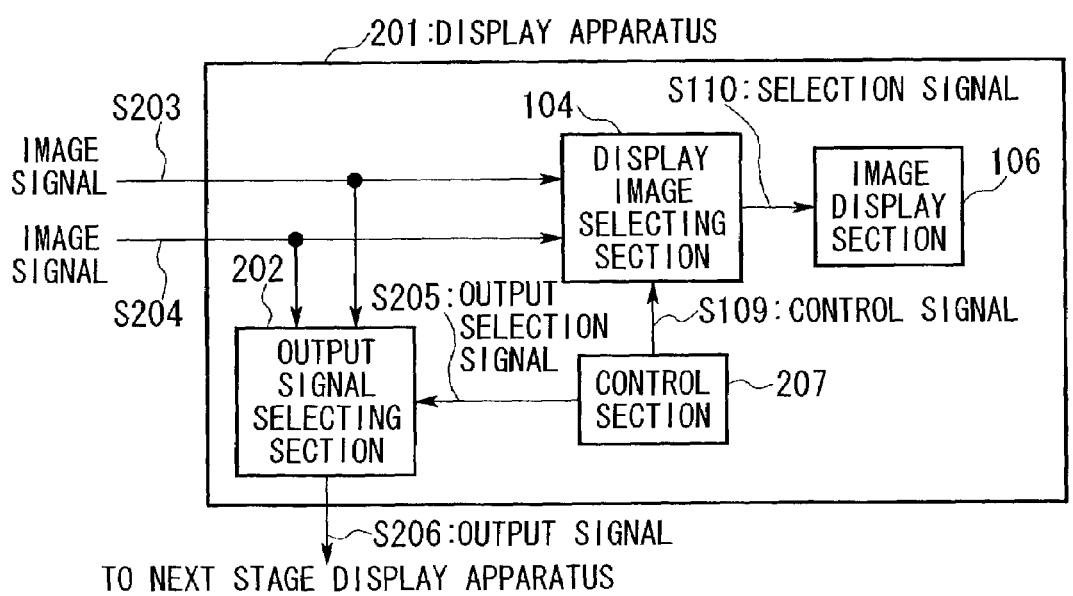
FIG. 12 is a block diagram showing a configuration of a display apparatus having an index function according to a sixth embodiment of the present invention.

FIG. 12 is a block diagram showing a connection configuration of a display apparatus having an index function according to a sixth embodiment of the present invention. Parts corresponding to FIG. 11 and FIG. 14 are given the same numbers, with repeated description omitted. In FIG. 12, a display apparatus 201 comprises an output signal selecting section 202, a display image selecting section 104, a control section 207, and an image display section 106. That is, with respect to the configuration of the conventional display apparatus 401 shown in FIG. 14, the configuration of the display apparatus 201 shown in FIG. 12 has the addition of the output signal selecting section 202. Also, the image signals S203 and S204 are input to the output signal selecting section 202 and the display image selecting section 104, and moreover the control signal S109 is transmitted from the control section 207 to the display image selecting section 104, the output selection signal S205 is transmitted from the control section 207 to the output signal selecting section 202, the selection signal S110 is transmitted from the display image selecting section 104 to the image display section 106, and the output signal S206 is transmitted from the output signal selecting section 202 to the next stage display apparatus.

Next is a description of the operation of the above configuration. Both the image signal S203 and the image signal S204 are input to the display image selecting section 104. When the user uses a switch or the like to select an image which they want to display on the display apparatus 201, the control signal S109 is generated by the control section 207 to be transmitted to the display image selecting section 104. The display image selecting section 104 selects either the image signal S203 or the image signal S204 as the display image, based on this control signal S109. The selected image signal is transmitted to the image display section 106 as the selection signal S110, and the image selected by the user is displayed on the display apparatus 201.

Also, both the image signal S203 and the image signal S204 are input to the output selecting section 202. Here, by the user using a switch or the like to select the signal which they want to output to the next stage display apparatus, the output selection signal S205 is transmitted from the control section 207 to the output signal selecting section 202. Because of this, the user can output either of the selected image signals S203 or S204 to the next stage display apparatus as the output signal S206.

Here, the image signal S203 is an index image signal containing an index, and the image signal S204 is a local image signal not containing an index. Now, displaying the index image signal containing an index on the display screen of the display apparatus 201, and outputting the index image signal containing an index to the next stage output signal S206 is considered. When the user outputs the output selection signal S205 which selects the image signal S203, to the output selecting section 202 by means of a switch or the like, the image signal S203 which is the image signal containing the index is output as the output signal S206 to the next stage display apparatus. Also, by outputting the control signal S109 which selects the image signal S203, from the control section 207 to the display image selecting section 104, the image signal S203 containing the index is output as the selection signal S110 to the image display section 106 and can be displayed.

Next, displaying the image signal not containing the index on the image screen of the display apparatus 201, and outputting the image signal containing the index to the next stage display apparatus as the output signal S206 is considered. The user, by outputting the output selection signal S205 which selects the image signal S203 to the output signal selecting section 202 by means of a switch or the like, outputs the image signal S203 containing the index to the next stage display apparatus as the output signal S206. Also, by outputting the control signal S109 which selects the image signal S204 to the display image selecting section 104, the image signal S204 not containing the index can be displayed in the image display section 106. Moreover, the image signal S203 may be a local image signal not containing the index, and the image signal S204 may be an image signal containing the index. Now, displaying the image signal containing the index on the image screen of the display apparatus 201, and outputting the image signal containing the index to the next stage display apparatus as the output signal S206 is considered. The user, by outputting the output selection signal S205 which selects the image signal S204 to the output signal selecting section 202 by means of a switch or the like, outputs the signal containing the index to the next stage display apparatus as the output signal S206. Also, by outputting the control signal 109 which selects the image signal S204 to the display image selecting section 104, the image signal S204 containing the index can be displayed in the image display section 106.

Next, displaying the image signal not containing the index on the image screen of the display apparatus 201, and outputting the image signal containing the index to the next stage as an output signal is considered. When the user outputs the output selection signal S205 which selects the image signal S204 to the output signal selecting section 202 by means of a switch or the like, the output signal S206 containing the index is output to the next stage display apparatus. Also, by outputting the control signal S109, which selects the image signal S203, to the display image selecting section 104, the image signal S203 not containing the index can be displayed in the image display section 106. In this way, by providing the output signal selecting section 202 to select an arbitrary image signal, even without having an index dedicated input section as in the fifth embodiment, the signal containing the index can be output to the next stage display apparatus by the user selecting the image signal containing the index as the output signal S206, without depending on the display image selection of the display apparatus 201.

Seventh Embodiment

Figure 13:
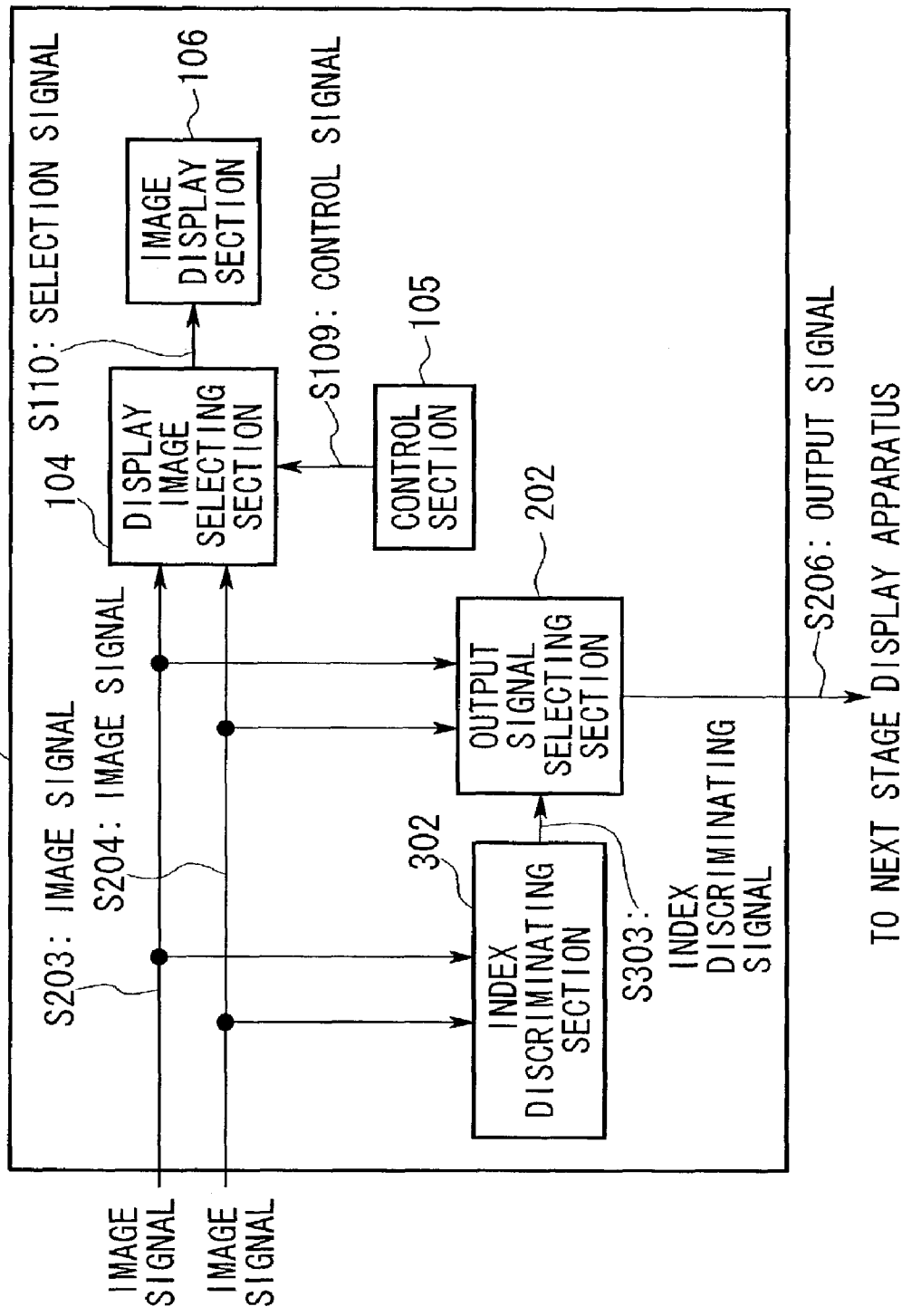
FIG. 13 is a block diagram showing a configuration of a display apparatus having an index function according to a seventh embodiment of the present invention.

FIG. 13 is a block diagram showing a connection configuration of a display apparatus having an index function according to a seventh embodiment of the present invention. Parts corresponding to FIG. 11, FIG. 12 and FIG. 14 are given the same numbers, with repeated description omitted.

With respect to the configuration of the display apparatus 201 shown in FIG. 12, the configuration of a display apparatus 301 shown in FIG. 13 has the addition of an index discriminating section 302. Consequently, with respect to the signals in FIG. 12, an index discriminating signal S303 transmitted from the index discriminating section 302 to the output signal selecting section 202 is added.

Next is a description of the operation of the above configuration. Both the image signal S203 and the image signal S204 are input to the display image selecting section 104. When the user selects the image they want to display on the display apparatus 301 by means of a switch and the like, the control signal S109 is generated by the control section 105 and transmitted to the display image selecting section 104. The display image selecting section 104 selects the display image from either the image signal S203 or the image signal S204 in accordance with the control signal S109. Then, the selected selection signal S110 is transmitted to the image display section 106, and the image selected by the user is displayed on the display apparatus 301.

Also, both the image signal S203 and the image signal S204 are input to the index discriminating section 302. Here, the index discriminating section 302 automatically detects which of the image signals S203 and S204 contains the index, and transmits the index discriminating signal S303, which is the result of the detection, to the output signal selecting section 202. On the other hand, both the image signal S203 and the image signal S204 are input to the output signal selecting section 202, but according to the discrimination result of the index discriminating signal S303, it is the image signal containing the index which is output from the output signal selecting section to the next stage display apparatus as the output signal S206.

Here, the image signal S203 is a signal containing the index, and the image signal S204 is a local signal not containing the index. Now, displaying the image signal containing the index on the image screen of the display apparatus 301, and outputting the image signal containing the index to the next stage display apparatus as an output signal is considered. As before, by automatic discrimination of the index, the image signal S203 containing the index is output as the output signal S206 to the next stage display apparatus. Also, by outputting the control signal S109 which selects the image signal S203 to the display image selecting section 104, the image signal S203 containing the index can be displayed in the image display section 106.

Next, displaying an image signal not containing the index on the image screen of the display apparatus 301, and outputting an image signal containing the index to the next stage display apparatus as the output signal S206 is considered. As before, by automatic discrimination of the index, the image signal S203 containing the index is output as the output signal S206 to the next stage display apparatus. Also, by outputting the control signal S109 which selects the image signal S204 to the display image selecting section 104, the image signal S204 not containing the index can be displayed in the image display section 106.

Moreover, the image signal S203 may be a local image signal not containing the index, and the image signal S204 may be an index image signal containing the index. Now, displaying an image signal containing the index on the image screen of the display apparatus 301, and outputting an image signal containing the index to the next stage display apparatus as the output signal S206 is considered. As before, by automatic discrimination of the index, the image signal S204 containing the index is output as the output signal S206 to the next stage display apparatus. Also, by outputting the control signal S109 which selects the image signal S204 to the display image selecting section 104, the image signal S204 containing the index can be displayed in the image display section 106.

Next, displaying an image signal not containing the index on the image screen of the display apparatus 301, and outputting an image signal containing the index to the next stage display apparatus as the output signal S206 is considered. As before, by automatic discrimination of the index, the image signal S204 containing the index is output as the output signal S206 to the next stage display apparatus. Also, by outputting the control signal S109 which selects the image signal S203 to the display image selecting section 104, the image signal S203 not containing the index can be displayed in the image display section 106.

As a result, even if the user does not select the signal where the index has been input as the output signal as in the sixth embodiment, because the index discriminating section 302 automatically discriminates whether or not the index is present, the image signal containing the index can be output to the next stage display apparatus regardless of the selection of the display image in the display apparatus 301.

The above embodiments are one example to explain the present invention, although the present invention is not limited to the above embodiments and other modifications are possible within the scope of the gist of the invention. For example, in the sixth and seventh embodiments, the case has been described where the selection signal which selectively displays the image to the image display section, and the output signal to the next stage display apparatus, are selected by the user performing an interchange selection operation, but the present invention is not limited to this. For example, it is possible to perform similar selection interchange by using other alternative means such as OSD operation and the like. Also, in each embodiment, the output of an image signal containing an index has been assumed, but if the image signal containing the index is read as the image signal not containing the index, then it is also possible to independently output an image signal not containing an index.

Moreover, in each embodiment two inputs to the display apparatus have been assumed, but even with a display apparatus having three or more inputs, it is also possible to output by discriminating an image signal containing an index and an image signal not containing an index, in a similar circuit configuration, by increasing the lines with respect to the image signal.

Also, in the seventh embodiment, for example, in FIG. 13 when inputting a signal with pixels of 1280 dots×1024 dots and a signal with pixels of 640 dots×480 dots to the image signals S203 and S204, if a 1280 dots×1024 dots signal discriminating section is provided instead of the index discriminating section 302, an image signal containing 1280dots×1024 dots can be automatically selected and output even in the case where a 1280×1024 signal is input to either of the image signals S203 and S204. That is, when multiply inputting image signals which have differences in the pixels, by having a function which automatically discriminates differences between signals instead of the index discriminating section 302, the corresponding signals alone can be automatically extracted and output. Moreover, by providing the above function which automatically discriminates differences between signals so as to be able to freely set the discrimination contents, the user can output and display the desired image signal if their preferred conditions are set.

The invention claimed is:

1. A multi-display control system, used in an image display system having a plurality of image display screens configured for displaying a single-sheet page image, one of which is defined as a main screen, arranged in front of an operator, comprising:
   an apparatus which controls the display of said image display screens by connecting an image signal generator having a predetermined format to said image display screens;
   an operating position detecting device comprising a pointing device or an active window detecting device, which detects an operating position;
   a screen recognizing device which recognizes, out of a plurality of said image display screens, a screen on which operations are being performed as an operating screen based on result of the operating position detecting device, a plurality of said image display screens displaying different images, respectively; and
   an image interchanging device which interchanges the display content of the operating screen with the display content of the main screen when said operating screen is different from said main screen.

2. The multi-display control system according to claim 1, wherein a page of information on a sheet is divided into a number of divisional portions corresponding to the number of the plurality of screens, and when the operating position detecting device detects the screen on which operation is performed, the multi-display control system interchanges the display content of the operating screen to the display content of the main screen located in front of the operator.

3. The multi-display control system according to claim 2, wherein said one page of information on a plain sheet is rounded into a ring shape so that the operating position detecting device can detect the operating position continuously by going around the ring shape.

4. The multi-display control system according to any one of claims 1, 2 or 3, wherein when the multi-display system comprises a plurality of display screens having different resolutions, the multi-display control system comprises a screen selecting device which selects a screen having a highest resolution as the main screen, and when the operating screen is other than the main screen, the display content of the operating screen is transferred to the main screen.

* * * * *